I. J. Morrow,
Cultivator.
No. 95,035. Patented Sep. 21, 1869.
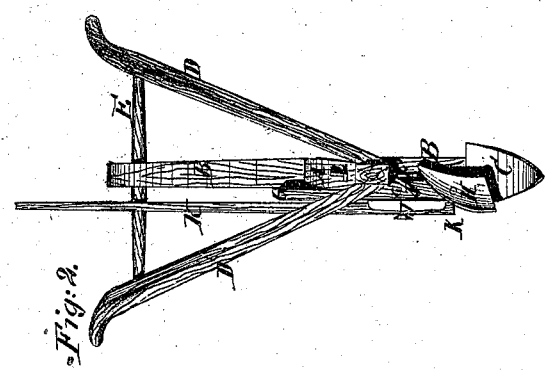
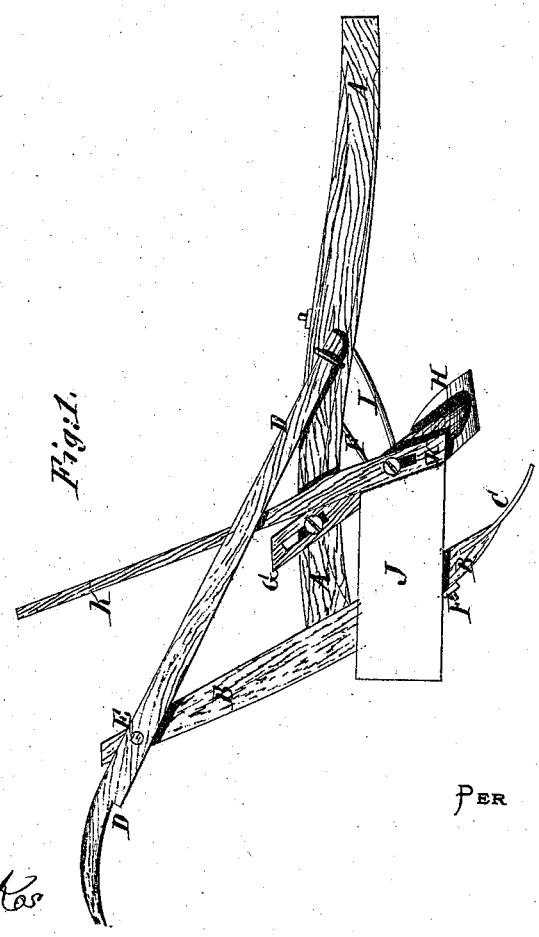
Witnesses:
Wm F. Clark
Jno F. Brooks
Inventor:
I. J. Morrow
Per
Attorneys.

UNITED STATES PATENT OFFICE.

ISAAC J. MORROW, OF EVERTON, INDIANA.

IMPROVEMENT IN CULTIVATORS.

Specification forming part of Letters Patent No. 95,035, dated September 21, 1869.

*To all whom it may concern:*

Be it known that I, ISAAC J. MORROW, of Everton, in the county of Fayette and State of Indiana, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a side view of my improved cultivator. Fig. 2 is a front view of the same.

Similar letters of reference indicate corresponding parts.

My invention has for its object to furnish an improved cultivator which shall be so constructed and arranged that the amount of dirt allowed to pass to the plants may be conveniently controlled and regulated; and it consists in the construction and combination of various parts of the cultivator, as hereinafter more fully described.

A is a plow-beam, to the rear end of which is attached the standard B, having a shovel or other plow, C, attached to its lower end.

D are the handles, the forward ends of which are attached to the middle part of the beam A, and the rear ends of which are supported and connected with the upwardly-projecting end of the standard B by the round or cross-bar E. The draft-strain upon the standard B is supported by the inclined brace-rod F, connecting the lower part of said standard with the beam A.

G is the forward standard, to the lower end of which is attached a diamond, spear, or other plow, H. The standard G is adjustably connected to the side of the plow-beam A by a bolt passing through a slot in said standard and into or through the beam A, so that the said standard may be conveniently raised and lowered, according as it is desired to throw off less or more dirt in front of the plow C, by which the fresh moist dirt is raised and thrown around the plants, the plow C always running deeper than the forward or surface plow, H, by which the clods and surface dirt are turned from the plants, as before described.

The draft-strain upon the standard G is supported by the inclined brace-rod I, one end of which is attached to the lower part of the said standard and the other end to its beam A.

J is a guard or fender plate, the forward end of which is securely and rigidly attached to the lower end of the lever-standard K, which is adjustably pivoted to the side of the lower part of the standard G by a bolt passing through a longitudinal slot in the lever K and into or through said standard G, so that the fender may be adjusted in a higher or lower position, according to the depth at which it is desired to have the plows work in the ground. The upper end of the lever K extends up into such a position that it may be conveniently reached and operated by the driver. By this construction, by moving the upper end of the lever K forward or rearward, the rear part of the fender J will be raised or lowered, allowing more or less fresh dirt to pass to the plants, as may be desired, and at the same time allowing larger plows to be used when cultivating small or tender plants than would otherwise be possible.

The arrangement of the plows herein described also allows the fender to be placed close to the plow, so that the cultivators can work closer to the rows of plants than is possible when constructed in the ordinary way.

Having thus described my invention, I claim as new and desire to secure by Letters Patent—

1. The adjustable standard G, so constructed that the plow H may always work at a higher level than the plow C of the rear standard, B, in combination with the beam A and rear standard, B, substantially as herein shown and described, and for the purpose set forth.

2. The adjustable pivoted lever K and fender J, in combination with the adjustable standard G, beam A, and rear standard, B, substantially as herein shown and described, and for the purpose set forth.

ISAAC J. MORROW.

Witnesses:
    GILBERT TRUSLER,
    JOSEPH T. TATE.